United States Patent
Halvorsrod et al.

(10) Patent No.: US 7,451,650 B2
(45) Date of Patent: Nov. 18, 2008

(54) SYSTEMS AND METHODS FOR ADJUSTING GAIN WITHIN AN ULTRASOUND PROBE

(75) Inventors: Thomas Halvorsrod, Tolvsrod (NO); Kjell Kristoffersen, Oslo (NO)

(73) Assignee: General Electric Company, Schenectady, NY (US)

( * ) Notice: Subject to any disclaimer, the term of this patent is extended or adjusted under 35 U.S.C. 154(b) by 889 days.

(21) Appl. No.: 10/928,079

(22) Filed: Aug. 27, 2004

(65) Prior Publication Data

US 2006/0042390 A1   Mar. 2, 2006

(51) Int. Cl.
*G01N 29/04* (2006.01)

(52) U.S. Cl. ........................................................ 73/603

(58) Field of Classification Search ................ 73/12.12, 73/606, 597, 620–631
See application file for complete search history.

(56) References Cited

U.S. PATENT DOCUMENTS

| | | | |
|---|---|---|---|
| 4,354,180 A * | 10/1982 | Harding | 340/619 |
| 5,077,541 A | 12/1991 | Gilbert | |
| 5,402,667 A * | 4/1995 | Atkinson et al. | 73/12.12 |
| 6,142,946 A | 11/2000 | Hwang et al. | |
| 6,326,855 B1 | 12/2001 | Jelinek et al. | |
| 6,445,248 B1 | 9/2002 | Gilbert | |
| 6,545,620 B2 | 4/2003 | Groeneweg | |
| 6,586,994 B2 | 7/2003 | Pomata et al. | |
| 6,628,170 B2 | 9/2003 | Titus | |

\* cited by examiner

*Primary Examiner*—Jewel Thompson
(74) *Attorney, Agent, or Firm*—The Small Patent Law Group; Dean D. Small (57) ABSTRACT

Systems and methods for adjusting gain are described. The systems includes a probe. The probe includes a housing, a transducer element configured to receive a signal, and an adjustable gain amplifier located inside the housing and configured to adjust a gain provided to the signal based on a function having a slope other than zero.

21 Claims, 8 Drawing Sheets

SYSTEMS AND METHODS FOR ADJUSTING GAIN WITHIN AN ULTRASOUND PROBE

BACKGROUND OF THE INVENTION

This invention relates generally to systems and methods for adjusting gain within an ultrasound probe and particularly to systems and methods for adjusting gain of amplifiers.

In ultrasound imaging systems, ultrasound energy is transmitted by a transducer towards a subject. Ultrasound echoes generated by the subject are received by the transducer. The ultrasound echoes are processed to generate an image of the subject.

However, when the ultrasound echoes are received from a near-field, a circuit coupled to the transducer elements may saturate and therefore, may function inappropriately. If the circuit saturates, information used to generate the image is lost.

Moreover, circuit elements within the ultrasound imaging system consume power. It is difficult to reduce a possibility of the saturation of the circuit and simultaneously control an amount of power consumed by the circuit elements.

BRIEF DESCRIPTION OF THE INVENTION

In one embodiment, a probe is described. The probe includes a housing, a transducer element configured to receive a signal, and an adjustable gain amplifier located inside the housing and configured to adjust a gain provided to the signal based on a function having a slope other than zero.

In another embodiment, an ultrasound imaging system is described. The ultrasound imaging system includes an ultrasound probe having a housing, a transducer element located within the housing and configured to receive a reflected echo signal from a subject, an amplifier located within the housing and configured to communicate with the transducer element. The amplifier is configured to receive an input signal from the transducer element and output an amplified signal based on the input signal. The ultrasound imaging system includes an adjustable feedback loop connected with the amplifier and configured to provide a feedback signal to the amplifier. The feedback signal varies based on the amplified signal.

In yet another embodiment, a method for adjusting a gain of an amplifier is described. The method includes receiving a signal from a subject, amplifying the signal according to a gain, and adjusting the gain during a period of time in which the signal is received from a near-field.

DETAILED DESCRIPTION OF THE INVENTION

Figure 1:
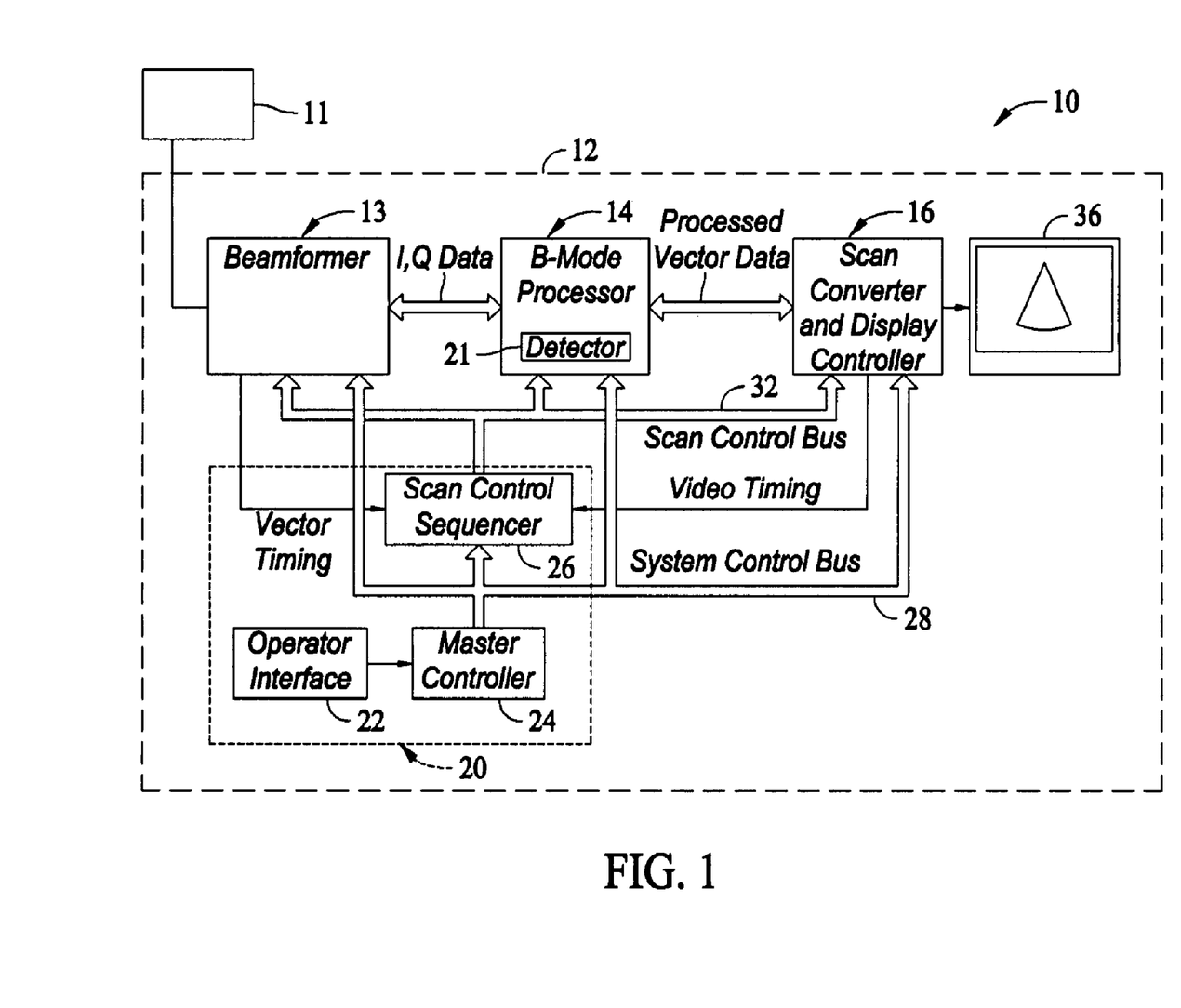
FIG. 1 is an embodiment of an ultrasound imaging system in which systems and methods for adjusting gain are implemented.

FIG. 1 is an embodiment of an ultrasound imaging system 10 in which systems and methods for adjusting gain are implemented. System 10 includes a probe 11 and is coupled to a sub-system 12. Sub-system 12 includes a beamformer 13, a B-mode processor 14, a scan converter and display controller (SCDC) 16 and a kernel 20. B-mode processor 14 includes a detector 21. Kernel 20 includes an operator interface 22, a master controller 24, and a scan control sequencer 26. Master controller 24 performs system level control functions. Master controller 24 accepts inputs from an operator via operator interface 22 as well as system status changes and makes appropriate changes to beamformer 13, B-mode processor 14, SCDC 16, scan control sequencer 26, and probe 11.

A system control bus 28 provides an interface from master controller 24 to beamformer 13, B-mode processor 14, SCDC 16, and scan control sequencer 26. Scan control sequencer 26 provides real-time control inputs, which are inputs at an acoustic vector rate, to beamformer 13, B-mode processor 14, and SCDC 16. Scan control sequencer 26 is programmed by master controller 24 with vector sequences and synchronization options for acoustic frame acquisitions. Scan control sequencer 26 broadcasts vector parameters that are defined by the operator to beamformer 13, B-mode processor 14, and SCDC 16 via scan control bus 32.

A main data path begins with amplified electrical signals, described below, input to beamformer 13 from probe 11. Beamformer 13 converts the amplified electrical signals into a stream of digital samples and outputs receive beams, which are shown as complex I,Q data, but in general, can also be RF or intermediate frequency data.

In an alternative embodiment in which probe 11 includes a sub-aperture beamformer 118 (FIG. 4), the main data path begins with a portion of the amplified electrical signals input to sub-aperture beamformer 118 and the remaining portion of the amplified electrical signals input to beamformer 13. Beamformer 13 and sub-aperture beamformer 118 convert the amplified electrical signals and output the receive beams.

The I,Q data is input to B-mode processor 14. B-mode processor 14 logarithmically amplifies the I,Q data and detects envelope of the I,Q data. B-mode processor 14 outputs the I,Q data as processed vector image data to SCDC 16. SCDC 16 accepts the processed vector image data and instructs a display device 36 to display an image on a screen of display device 36. An example of the image that is displayed includes a 2-dimensional (2D) image that distinguishes various portions of a subject, such as a phantom or alternatively a human being, based on the brightness of pixels of the 2D image. Another example of the image displayed is a 3-dimensional (3D) image. Examples of display device 36 includes a grey-scale monitor and a color monitor.

In an alternative embodiment, ultrasound imaging system 10 scans in various scan modes such as a fundamental mode, a harmonic mode, a color flow mode, a PDI mode, a contrast mode, or a B-flow mode. In the fundamental mode, images are generated from echo signals at fundamental frequencies and in the harmonic mode, images are generated from echo signals at harmonic frequencies. In the color flow mode, a Doppler processor (not shown) is used in parallel to or replaces B-mode processor 14. The I,Q data is provided to the Doppler processor to extract Doppler frequency shift information for color flow mode. The Doppler processor estimates Doppler parameters, such as, velocity, variance and power for estimating motion of flow of blood inside the subject. The Doppler parameters are estimated using procedures such as auto-correlation or cross-correlation. In the PDI mode, power is used to estimate motion of flow of blood inside the subject. In the contrast mode, a contrast agent that usually includes an air bubble is used to improve contrast between signals from different anatomical structures, such as, a tumor and a liver of the subject. The B-flow mode represents the flow of blood inside the subject.

Figure 2:
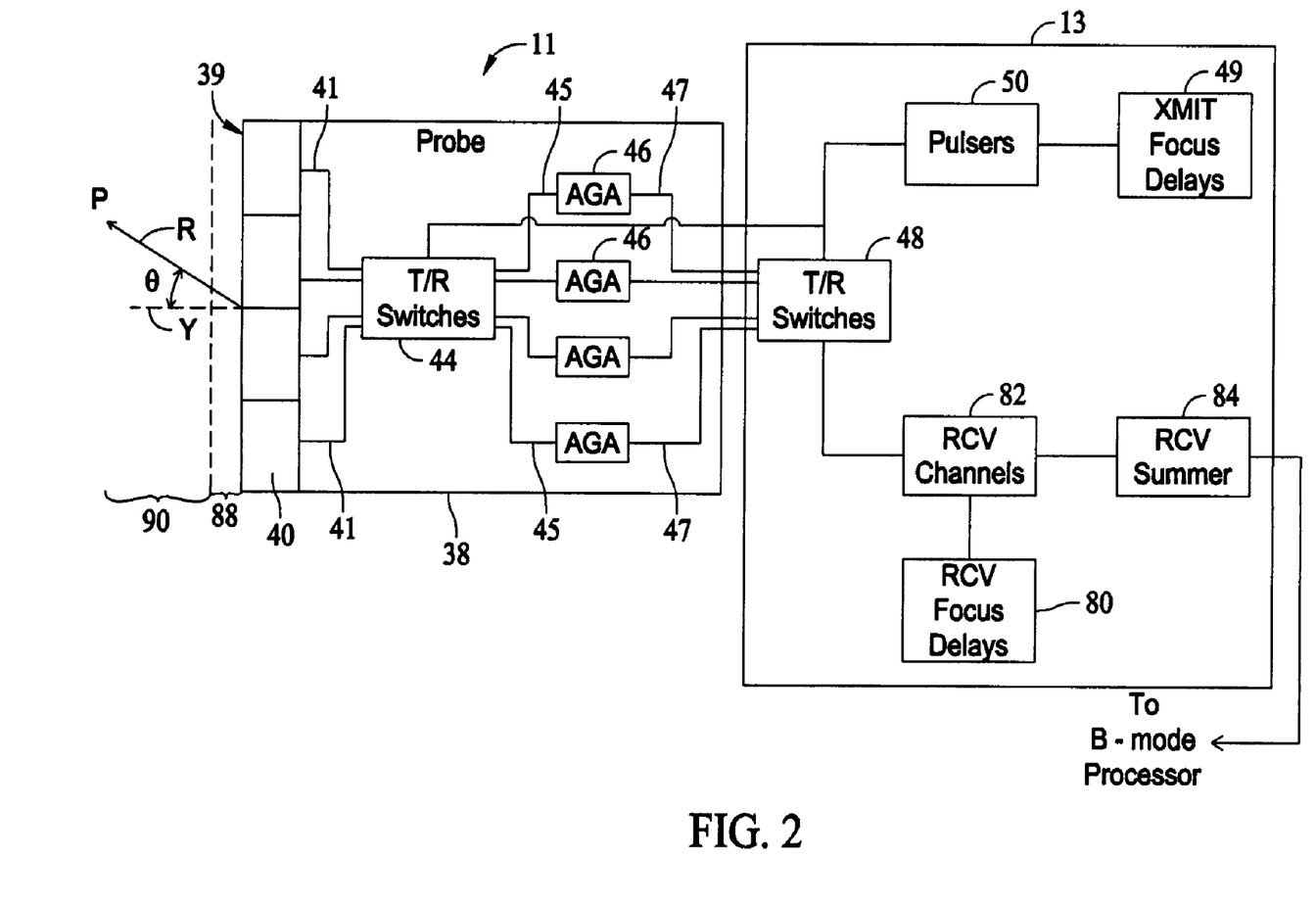
FIG. 2 shows an embodiment of a beamformer of a sub-system and a probe including a transducer array located with the ultrasound imaging system of FIG. 1.

FIG. 2 shows an embodiment of probe 11 and beamformer 13 of sub-system 12. Probe 11 has a housing 38 that includes an array 39 of transducer elements 40, a plurality of transmit/receive (T/R) switches 44, such as diodes, and adjustable gain amplifiers (AGAs) 46. In an alternative embodiment, probe 11 includes a number of transducer elements greater than four. In yet another alternative embodiment, probe 11 includes a number of transducer elements between one and four. In another embodiment, a number of transducer elements 40 is the same as that of AGAs 46. For example, if housing 38 includes four transducer elements 40, housing 38 includes four AGAs 46. As another example, if housing 38 includes one transducer element 40, housing 38 includes one AGA 46. In yet another alternative embodiment, a number of transducer elements 40 is different than that of AGAs 46. For example, if housing 38 includes four transducer elements 40, housing 38 includes three AGAs 46.

In an alternative embodiment, probe 11 includes sub-aperture beamformer 118 that is coupled between AGAs 46 and T/R switches 48 and that has similar functionality to that of beamformer 13. Each AGA 46 is directly coupled to sub-aperture beamformer 118, which is directly coupled to T/R switches 48. As an example, processes, described below, performed by beamformer 13 are performed by sub-aperture beamformer 118 on a portion of the amplified electrical signals and beamformer 13 performs the processes on a remaining portion of the amplified electrical signals. Master controller 24 controls the functionality of sub-aperture beamformer 118. Master controller 24 continuously provides signals to probe 11 and the signals control gains of AGAs 46 within probe 11.

AGA 46 is located inside housing 38 of probe 11. AGAs 46 are connected to transducer elements 40 via a plurality of wires 41 and 45, and T/R switches 44. As an example, a first AGA 46 is connected via wire 41, T/R switches 44, and wire 45 to transducer element 40 and a second AGA 46 is connected via 41, T/R switches 44, and wire 45 to transducer element 40. Wires 41 couple transducer elements 40 to T/R switches 44 and wires 45 couple T/R switches 44 to AGAs 46. In an alternative embodiment, housing 38 includes one AGA 46 coupled via wire 41, T/R switches 44, and wire 45 to one transducer element 40. Wires 47 couple AGAs 46 to T/R switches 48. Housing 38 is of a shape, such as polygonal, square, conical, and rectangular, and a size. Beamformer 13 includes a plurality of T/R switches 48, a plurality of transmit focus delays 49, a plurality of pulsers 50, a plurality of receive focus delays 80, a plurality of receive channels 82, and a receive summer 84.

Each transducer element 40 produces a burst of ultrasonic energy when energized by a pulsed waveform produced by beamformer 13. The subject receives the ultrasonic energy and generates reflected echo signals, which is ultrasonic energy reflected from the subject. The reflected echo signals include near-field echo signals, which are reflected from a portion of the subject lying in a near-field 88, and include far-field echo signals, which are reflected from a portion of the subject lying in a far-field 90. An example of near-field 88, for low-frequency, such as 2.5 megahertz, ultrasound signals transmitted from transducer elements 40 is a distance covering four centimeters (cm) from transducer elements 40. As another example of near-field 88 for high frequency ultrasound signals transmitted from transducer elements 40, is a distance from transducer elements 40 that decreases proportional to a change in the high-frequency. As yet another example, during tens of microseconds after ultrasonic energy is transmitted from transducer elements 40, the reflected echo signals are received from near-field 88. An example of the far-field 90 is a distance between four cm and ten cm from transducer elements 40. The reflected echo signals reflected back to transducer array 39 from the subject under study are converted to electrical signals by transducer elements 40. Electrical signals output from transducer elements 40 are applied via wires 41, T/R switches 44 and wires 45 to AGAs 46 that amplify the electrical signals to generate the amplified electrical signals. For example, an electrical signal output from a first of transducer elements 40 is applied via wire 41, T/R switches 44 and wire 45 to a first of AGAs 46 and an electrical signal output from a second of transducer elements 40 is applied via wire 41, T/R switches 44 and wire 45 to a second of AGAs 46. The amplified electrical signals are received by beamformer 13 from AGA 46 through a set of transmit/receive (T/R) switches 48 and via wires 47. In an alternative embodiment, the amplified electrical signals are received by sub-aperture beamformer 118 and beamformer 13. T/R switches 48 are typically diodes which protect beamformer 13 from high voltages generated by beamformer 13.

Transducer elements 40 are driven by beamformer 13 such that the ultrasonic energy produced by transducer elements 40 is directed or steered into a beam. To accomplish the steering of ultrasonic energy, respective transmit focus time delays 49 are imparted to each of pulsers 50. Each pulser 50 is connected to a respective transducer element 40 via T/R switches 44 and T/R switches 48. As an example, transmit focus time delays 49 are read from a look-up table. By appropriately adjusting transmit focus time delays 49, the steered beam is directed away from a y-axis by an angle $\theta$ and focused at a range R on a point P. In an alternative embodiment, by appropriately adjusting transmit focus time delays 49, the steered beam is directed away from the y-axis by an angle $\theta$ and at an angle $\phi$ extending from a plane formed by the range R and the y-axis.

The reflected echo signals are produced by each burst of ultrasonic energy reflected from the anatomical structures located at successive ranges along the steered beam. The reflected echo signals are sensed separately by each transducer element 40 and a sample of magnitude of the reflected echo signals at a point in time represents an amount of reflection occurring at a range from the anatomical structures. Due to differences in propagation paths between the point P and each transducer element 40, however, the reflected echo signals will not be detected simultaneously and their amplitudes will not be equal. Beamformer 13 imparts a time delay to each of the amplified electrical signals to generate delayed signals and sums the delayed signals to provide one of the receive beams, which accurately indicates a total amount of ultrasonic energy reflected from the point P. Beamformer 13 imparts a time delay to each of the amplified electrical signals by imparting respective receive focus time delays 80 to respective receive channels 82. Each receive channel 82 is connected to a respective transducer element 40 via T/R switch 48, wire 47, AGA 46, wire 45, T/R switch 44, and wire 41. As an example, receive focus time delays 80 are read from a look-up table. The delayed signals are summed in receive summer 84 to generate one of the receive beams. In an alternative embodiment, sub-aperture beamformer 118 receives a portion of the amplified electrical signals and beamformer 13 receives the remaining portion of the amplified electrical signals, and sub-aperture beamformer 118 and beamformer 13 generate the receive beams.

Detector 21, incorporated in B-mode processor 14, receives the receive beams from beamformer 13. In an alternative embodiment, detector 21 receives the receive beams from beamformer 13 and sub-aperture beamformer 118. The I,Q data includes I and Q values, which are values of the receive beams that represent in-phase and quadrature components of a magnitude of reflected echo signals reflected from the point P at the range R and the angle θ. Detector 21 computes a magnitude $(I^2+Q^2)^{1/2}$ to generate the processed vector image data.

SCDC 16 receives the processed vector image data from B-mode processor 14 and converts the processed vector image data into an image for display. In particular, a scan converter (not shown), located within SCDC 16, converts the processed vector image data from a polar coordinate format to a Cartesian coordinate format and displays the processed vector image data as an image on display device 36, which images a time-varying amplitude of the processed vector image data. Alternatively if the processed vector image data is in a Cartesian coordinate format, SCDC 16 scales the processed vector image data to generate scaled processed vector image data and displays the scaled processed vector image data.

Figure 3:
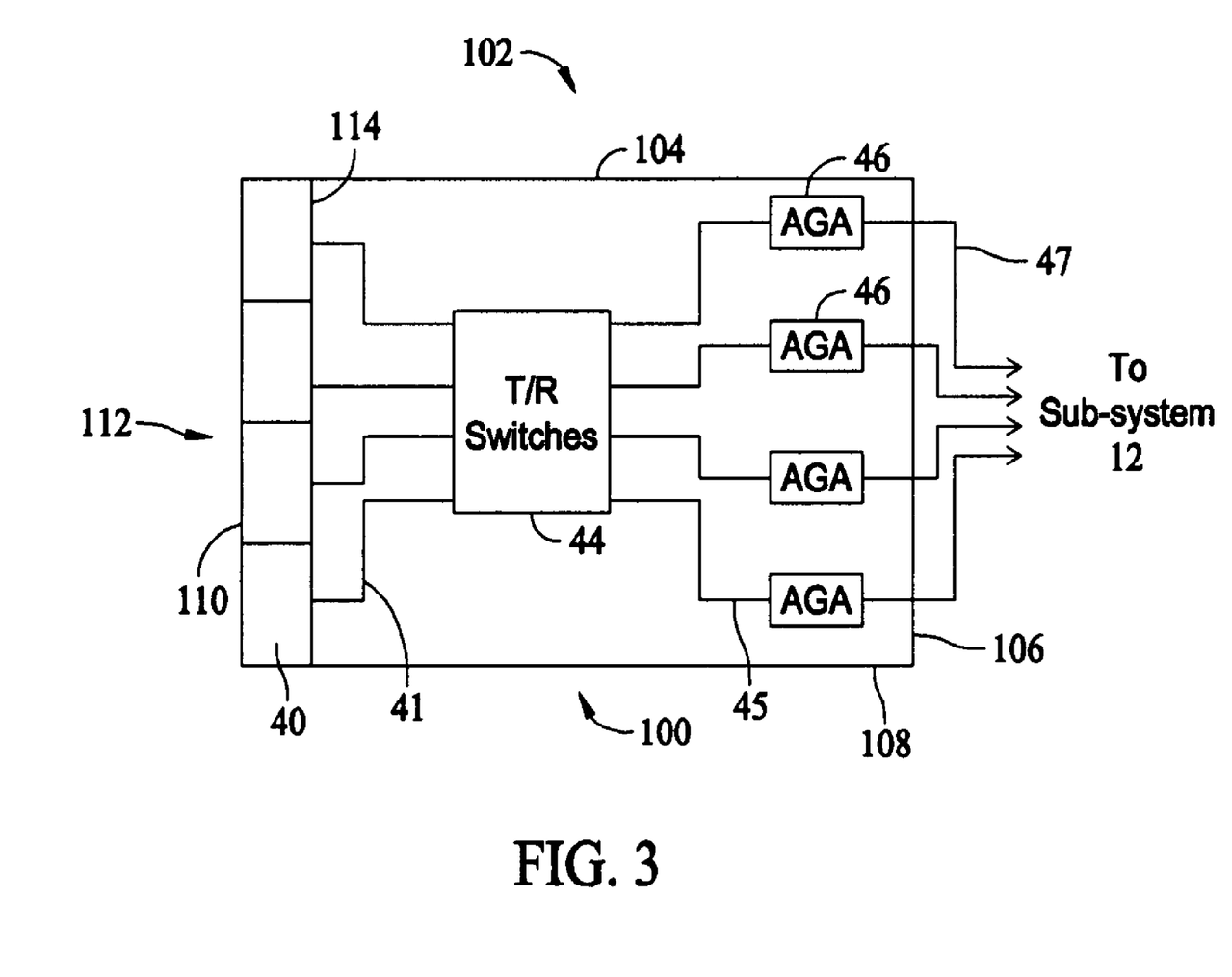
FIG. 3 shows an embodiment of a housing of a probe that receives reflected echo signals from a subject imaged by the ultrasound imaging system of FIG. 1.

FIG. 3 shows an embodiment of a housing 100 of a probe 102 that receives the reflected echo signals from the subject. Housing 100 is a polygonal shaped housing that has four surfaces including surfaces 104, 106, 108, and 110. Each of surfaces 104 and 108 form an angle greater than zero degrees and less than 180 degrees with surface 106. An array 112 of transducer elements 40 forms an angle greater than zero degrees and less than 180 degrees with each of surfaces 104 and 108. Surface 110 includes a surface of the transducer elements 40 and is located opposite to a surface 114 to which T/R switches 44 are coupled via wires 41. AGAs 46 and T/R switches 44 are enclosed within a volume formed by surfaces 104, 106, 108, and 110.

Figure 4:
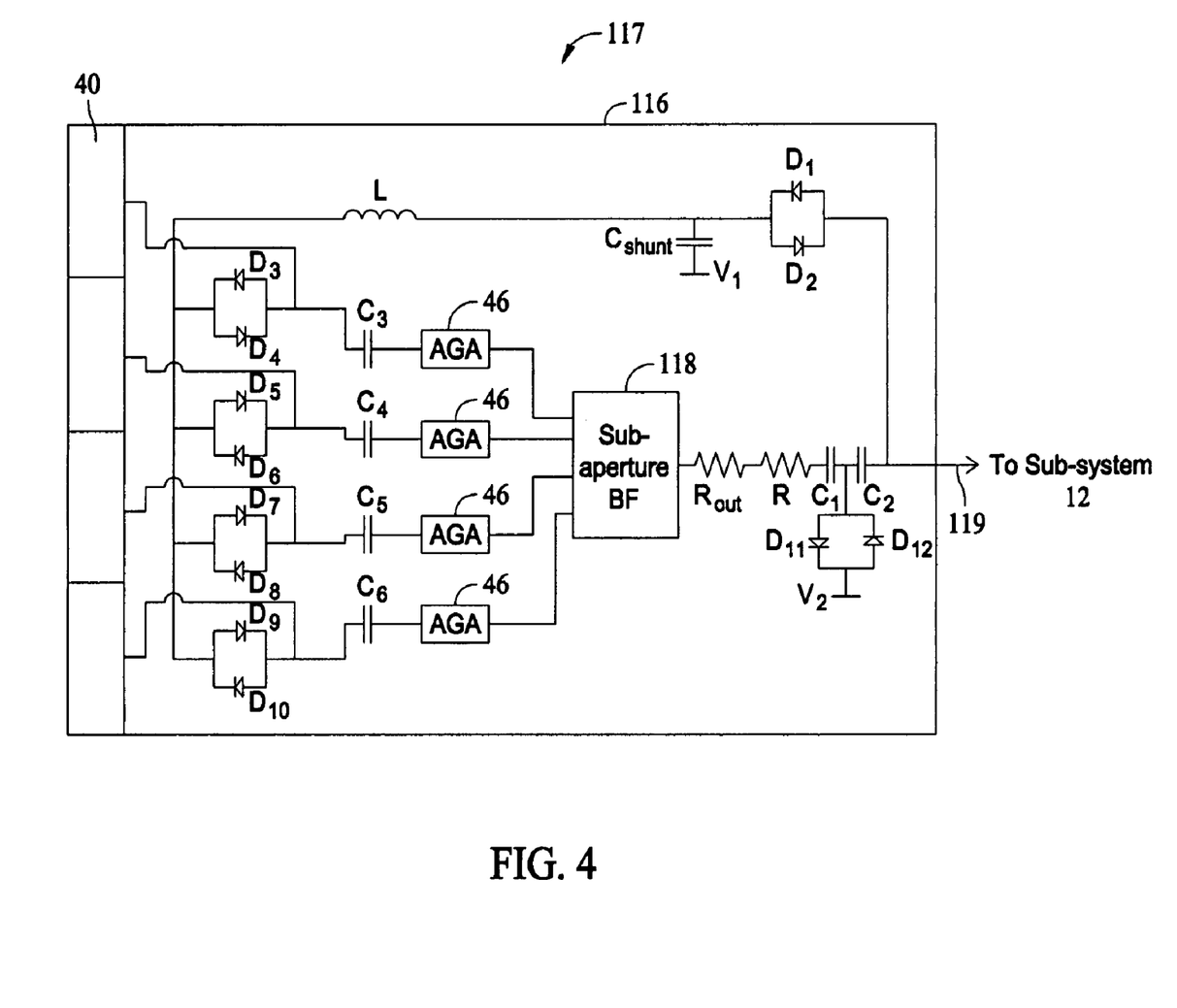
FIG. 4 shows a circuit diagram of an embodiment of a probe that receives the reflected echo signals from the subject imaged using the ultrasound imaging system of FIG. 1.

FIG. 4 shows an embodiment of a housing 116 of a probe 117 that receives the reflected echo signals from the subject imaged. Probe 117 includes diodes $D_1$, $D_2$, $D_3$, $D_4$, $D_5$, $D_6$, $D_7$, $D_8$, $D_9$, $D_{10}$, $D_{11}$, and $D_{12}$, capacitors $C_1$, $C_2$, $C_3$, $C_4$, $C_5$, $C_6$, and $C_{shunt}$, an inductor L, resistors R and $R_{out}$, AGAs 46, transducer elements 40, and sub-aperture beamformer 118. $C_{shunt}$ is coupled between a voltage $V_1$ and diode $D_2$. Diode $D_1$, is coupled between a voltage $V_2$ and capacitor $C_2$. Number of capacitors $C_3$, $C_4$, $C_5$ and $C_6$ are the same as number of AGAs 46. For example, if housing includes two AGAs 46, capacitors $C_3$ and $C_4$ are coupled to the two AGAs 46. Similarly, number of diodes $D_3$, $D_4$, $D_5$, $D_6$, $D_7$, $D_8$, $D_9$, $D_{10}$ within housing are proportional to number of AGAs 46. For example, if housing 116 includes two AGAs 46, diodes $D_3$ and $D_4$ are coupled to one of the two AGAs 46 and diodes $D_5$ and $D_6$ are coupled to the remaining one of the two AGAs 46. Pulsers 50 are connected to transducer elements 40 via diodes $D_1$, $D_2$, $D_3$, $D_4$, $D_5$, $D_6$, $D_7$, $D_8$, $D_9$, and $D_{10}$. For example, pulser 50 is coupled to transducer element 40 via diodes $D_1$, $D_2$, $D_3$ and $D_4$. As another example, pulser 50 is coupled to transducer element 40 via diodes $D_1$, $D_2$, $D_5$ and $D_6$.

Pulsers 50 transmit transmit pulses to AGAs 46 via a wire 119 and diodes $D_1$, $D_2$, $D_3$, $D_4$, $D_5$, $D_6$, $D_7$, $D_8$, $D_9$, $D_{10}$. During transmission, the transmit pulses, which have a high magnitude, short circuit diodes $D_1$, $D_4$, $D_5$, $D_7$, and $D_9$ and open circuit diodes $D_2$, $D_3$, $D_6$, $D_8$, and $D_{10}$. During the transmission, AGAs 46 and sub-aperture beamformer 118 are protected from the high magnitude of the transmit pulses by diodes $D_{11}$, $D_{12}$, and capacitor $C_2$. By appropriately adjusting transmit focus time delays 49 imparted to pulsers 50, the steered beam is generated and the ultrasonic energy is produced by transducer elements 40. The subject generates the reflected echo signals based on the ultrasonic energy generated by transducer elements 40. During reception, transducer elements 40 receive the reflected echo signals and generate the electrical signals. During the reception, diodes $D_3$, $D_4$, $D_5$, $D_6$, $D_7$, $D_8$, $D_9$, $D_{10}$ are open-circuited because voltage of the reflected echo signals is low. During the reception, transducer elements 40 are isolated from each other because diodes $D_3$, $D_4$, $D_5$, $D_6$, $D_7$, $D_8$, $D_9$, $D_{10}$ are open-circuited. AGAs 46 generate the amplified electrical signals from the electrical signals generated by transducer elements 40. Sub-aperture beamformer receives the amplified electrical signals from AGA 46 and generate the receive beams from the amplified electrical signals. Sub-aperture beamformer 118 generates one of the receive beams by imparting programmable time delays to the amplified electrical signals generated by AGAs 46. Sub-aperture beamformer 118 transmits the receive beams to sub-system 12 via wire 119.

Figure 5:
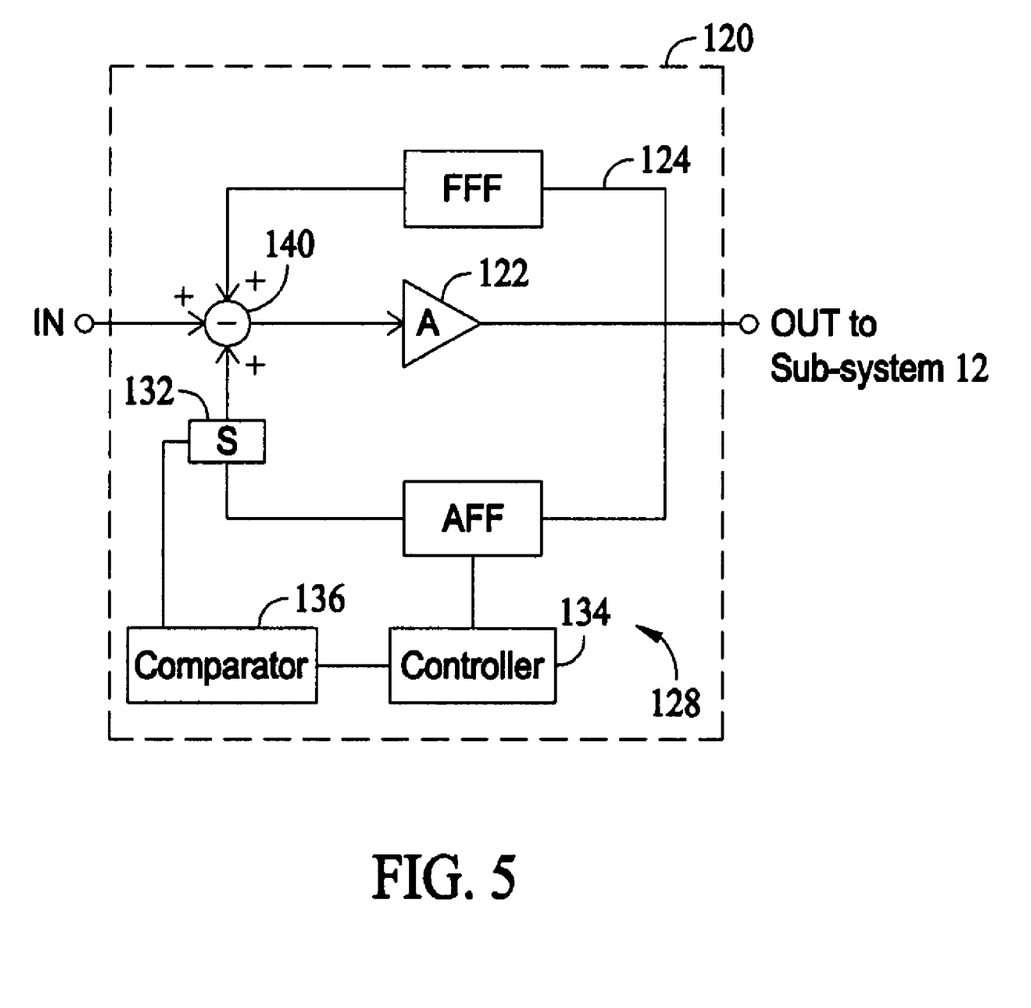
FIG. 5 shows an embodiment of adjustable gain amplifiers (AGAs) coupled to the transducer array of FIG. 2.

FIG. 5 shows an embodiment of an AGA 120 coupled to T/R switches 44 at an input IN and to T/R switches 48 at an output OUT. AGA 120 includes an amplifier 122, such as a low noise amplifier, a fixed feedback loop 124 having a fixed feedback factor (FFF), and an adjustable feedback loop 128. FFF has a constant value. Adjustable feedback loop includes 128 an adjustable feedback factor (AFF), a switch 132, a controller 134, and a comparator 136. In an alternative embodiment, AGA 120 does not include switch 132 and comparator 136. Controller, as used herein, is not limited to just those integrated circuits referred to in the art as computers, but broadly refers to processors, microcontrollers, microcomputers, programmable logic controllers, application specific integrated circuits, and other programmable circuits.

Examples of FFF include passive impedance elements, such as, an inductor, a capacitor, and a resistor, and active elements, such as, a voltage controlled voltage source (VCVS), a current controlled voltage source (CCVS), a current controlled current source (CCCS), a voltage controlled current source (VCCS) and a combination of the inductor, the capacitor, the resistor, the VCVS, the CCVS, the CCCS, and the VCCS. An example of VCVS includes a voltage amplifier, an example of CCVS includes a trans-impedance amplifier, an example of CCCS includes a current amplifier, and an example of VCCS includes a trans-conductance amplifier. An example of a combination of a resistor and a capacitor includes the resistor in series with the capacitor. An example of a combination of a resistor and an inductor includes the resistor in series with the inductor. Examples of AFF include an adjustable VCVS, such as an adjustable voltage gain amplifier, an adjustable CCVS, such as variable resistor or a variable trans-impedance cell, an adjustable CCCS, such as a variable current amplifier or a variable Gilbert cell, an adjustable VCCS, such as a variable trans-conductance amplifier, and a combination of the adjustable VCVS, the adjustable CCVS, the adjustable CCCS, and the adjustable VCCS. As an example, a combination of a variable resistor, a variable capacitor, and a variable inductor includes the variable resistor in series with the variable capacitor and the variable inductor.

An example of amplifier 122 includes a voltage amplifier having a high input impedance, such as infinite input impedance, and a low output impedance, such as zero output impedance. As another example, amplifier 122 includes a trans-impedance amplifier having a low input impedance, such as zero input impedance, and the low output impedance. As yet another example, amplifier 122 includes a trans-admittance amplifier having the high input impedance and a high output impedance, such as infinite output impedance. As another example, amplifier 122 includes a current amplifier having the low input impedance and the high output impedance. As another example, amplifier 122 includes a power amplifier having a defined input impedance and a defined output impedance. The defined input impedance is a value, such as 60 ohms, between the low input impedance and the high input impedance. The defined output impedance is a value, such as 60 ohms, between the low output impedance and the high output impedance. As yet another example, amplifier 122 includes a combination of the low input impedance, the defined input impedance, the high input impedance, the low output impedance, the defined output impedance, and the high output impedance. As an example, amplifier 122 has the low input impedance and the defined output impedance. FFF is coupled in parallel with amplifier 122 and is coupled to IN and OUT. AFF is coupled to OUT and to switch 132, which is coupled to IN. Comparator 136 is coupled in series with controller 134 and is coupled to switch 132.

Amplifier 122 receives a sum signal, described below, and amplifies the sum signal based on an open-loop gain, referred to as a fixed gain, of amplifier 122 to generate an amplified electrical signal at OUT. FFF samples an amplified electrical signal from OUT, modifies the amplified electrical signal by applying a value, such as a capacitance, a resistance, an inductance, and a trans-conductance, or alternatively a combination of the capacitance, the resistance, the inductance, and the trans-conductance, and generates a fixed feedback signal at a node 140. Adjustable feedback loop 128 samples an amplified electrical signal from OUT, modifies the amplified electrical signal by applying a value, such as a variable capacitance, a variable resistance, a variable inductance, and a variable trans-conductance, or alternatively a combination of the variable capacitance, the variable resistance, the variable inductance, the variable trans-conductance, a resistance, a a capacitance, an inductance, and a trans-conductance, and generates an adjustable feedback signal at node 140. It is noted that adjustable feedback loop 128 modifies an amplified electrical signal sampled at OUT by applying at least one adjustable value, such as, a variable capacitance, a variable resistance, a variable inductance, and a variable trans-conductance.

When transducer elements 40 are receiving the reflected echo signals from near-field 88, controller 134 changes a value of AFF by applying one of functions including a random function, a sine function, a cosine function, a tan function, an exponential function, a linear function, a square root function, and a logarithmic function, to AFF. As an example, the exponential function has a slope ranging from a number greater than zero to one along all points of the exponential function. In an alternative embodiment, controller 134 changes a value of AFF by applying a combination of the functions to AFF. As an example, the combination of the functions is a sum of the linear and square root functions. As another example, the combination of the functions includes the exponential function from a time A to a time B and the linear function from the time B to a time C. As yet another example, the combination of the functions includes a function having a slope of 0.5 from the time A to the time B and a slope of 1 from the time B to the time C. As another example, controller 134 applies one or alternatively a combination of the functions within a look-up table stored within a memory (not shown) to AFF. In another alternative embodiment, controller 134 does not apply a constant function having a slope of zero at all points along the constant function to change a value of AFF. For example, controller 134 applies a non-constant function having a slope of 0.3 from the time A to the time B, a slope of zero from the time B to the time C, and a slope of 0.2 from time the C to a time D.

When transducer elements 40 are receiving the reflected echo signals from near-field 88, comparator 136 compares a signal received from controller 134 with a reference signal. If comparator 136 determines based on the comparison that an amplitude of a signal received from controller 134 is at least equal to a pre-determined amplitude of the reference signal, comparator 136 does not send a signal to switch 132 to open switch 132. An amplitude of a signal received from controller 134 is at least equal to the pre-determined amplitude of the reference signal during a period of time in which transducer elements 40 receive the reflected echo signals from near-field 88. The pre-determined amplitude is stored before comparator 136 compares an amplitude of a signal received from controller 134 with the pre-determined amplitude of the reference signal. Switch 132 remains closed when transducer element 40 receives the reflected echo signals from near-field 88.

When switch 132 is closed, an electrical signal at IN, a fixed feedback signal output from FFF, and an adjustable feedback signal output from AFF are summed at a node to generate a sum signal and the sum signal is provided to amplifier 122. In one embodiment, an adjustable feedback signal output from adjustable feedback loop 128 is opposite in polarity to that of a fixed feedback signal output from fixed feedback loop 124. In an alternative embodiment, an adjustable feedback signal output from adjustable feedback loop 128 has the same polarity as that of a fixed feedback signal output from fixed feedback loop 124.

Controller 134 continues to apply one or alternatively a combination of the functions to AFF during a period of time during which transducer elements 40 receive the reflected echo signals from near-field 88. As an example, controller 134 calculates a period of time during which transducer elements 40 receive the reflected echo signals from near-field 88 by multiplying a distance traveled by the reflected echo signals by two to generate a result and dividing the result by a speed of the reflected echo signals in a medium in which the reflected echo signals travel. As another example, controller 134 does not calculate a period of time during which transducer elements 40 receive the reflected echo signals from near-field 88 and the period of time is stored in controller 134.

When transducer elements 40 receive the reflected echo signals from far-field 90, controller 134 discontinues applying one or alternatively a combination of the functions to AFF. When transducer elements 40 are receiving the reflected echo signals from far-field 90, comparator 136 compares an amplitude of a signal received from controller 134 with the pre-determined amplitude of the reference signal. If comparator 136 determines, based on the comparison, that an amplitude of a signal received from controller 134 is less than the pre-determined amplitude of the reference signal, comparator 136 provides a signal to switch 132 to open switch 132. An amplitude of a signal received from controller 134 is less than the pre-determined amplitude of the reference signal during a period of time in which transducer elements 40 receive the reflected echo signals from far-field 90. As another example, an amplitude of a signal received by comparator 136 from controller 134 is less than the pre-determined amplitude of the reference signal when AFF is approximately equal to zero or alternatively is equal to zero.

Controller 134 discontinues to apply one or alternatively a combination of the functions to AFF during a period of time during which transducer elements 40 receive the reflected echo signals from far-field 90. As an example, controller 134 calculates a period of time during which transducer elements 40 receive the reflected echo signals from far-field 90 by multiplying a distance traveled by the reflected echo signals by two to generate a result and dividing the result by a speed of the reflected echo signals in a medium in which the reflected echo signals travel. As another example, controller 134 does not calculate a period of time during which transducer elements 40 receive the reflected echo signals from far-field 90 and the period of time is stored in controller 134.

In an alternative embodiment, controller 134 continues to apply one or alternatively a combination of the functions to AFF during a period of time during which transducer elements 40 receive the reflected echo signals from far-field 90. Comparator 136 compares a signal received from controller 134 with the reference signal. If comparator 136 determines based on the comparison that an amplitude of a signal received from controller 134 is less than the pre-determined amplitude of the reference signal, comparator 136 does not send a signal to switch 132 to open switch 132. An amplitude of a signal received from controller 134 is less than the pre-determined amplitude of the reference signal during a period of time in which transducer elements 40 receive the reflected echo signals from far-field 90. Switch 132 remains closed when transducer elements 40 receive the reflected echo signals from far-field 90. When transducer elements 40 receive the reflected echo signals from near-field 88, controller 134 discontinues applying one or alternatively a combination of the functions to AFF. Comparator 136 compares an amplitude of a signal received from controller 134 with the pre-determined amplitude of the reference signal. If comparator 136 determines, based on the comparison, that an amplitude of a signal received from controller 134 is at least equal to than the pre-determined amplitude of the reference signal, comparator 136 provides a signal to switch 132 to open switch 132. An amplitude of a signal received from controller 134 is at least equal to the pre-determined amplitude of the reference signal during a period of time in which transducer elements 40 receive the reflected echo signals from near-field 88. Controller 134 discontinues to apply one or alternatively a combination of the functions to AFF during a period of time in which transducer elements 40 receive the reflected echo signals from near-field 88.

In yet another alternative embodiment, controller 134 continues to apply one or alternatively a combination of the functions to AFF during a period of time during which transducer elements 40 receive the reflected echo signals from near-field 88 and far-field 90. Switch 132 remains closed when transducer elements 40 receive the reflected echo signals from near-field 88 and far-field 90.

A type of output generated by amplifier 122 is converted to a type of input to AFF and a type of output from AFF is converted to a type of input to amplifier 122. For example, if amplifier 122 is a trans-admittance amplifier, the trans-admittance amplifier outputs a current when a voltage is input to the trans-admittance amplifier. If amplifier 122 is a trans-admittance amplifier, AFF includes an adjustable CCVS that samples a current output from amplifier 122 and converts the current into a voltage, which is provided as an input to amplifier 122. As another example, if amplifier 122 is a trans-impedance amplifier, the trans-impedance amplifier outputs a voltage when a current is input to the trans-impedance amplifier. If amplifier 122 is a trans-impedance amplifier, AFF includes an adjustable VCCS that samples a voltage output from amplifier 122 and converts the voltage into a current, which is provided as an input to amplifier 122. As yet another example, if amplifier 122 is a voltage amplifier that outputs a voltage when a voltage is input to amplifier 122, AFF is an adjustable VCVS that samples the voltage output from amplifier 122 and outputs a voltage. As another example, if amplifier 122 is a current amplifier that outputs a current when a current is input to amplifier 122, AFF is an adjustable CCCS that samples the current output from amplifier 122 and outputs a current.

A phase of AFF is proportional to a phase of FFF. For example, if FFF has a phase of −90 degrees, AFF has a phase of −180 degrees, and if the phase of FFF changes to −70 degrees, the phase of AFF changes to −140 degrees. As yet another example, if a value of FFF equals $1/(2*\pi*j*0.5$ picofarads$*f)$ and if a value of an impedance $Z_{CC}$ (shown in FIG. 5) placed between node 140 and IN equals $1/(2*\pi*j*10$ picofarads$*f)$ then AFF has a value proportional to $2*\pi*j*f$, where f represents frequency, j equals square root of negative one, and * represents multiplication. In an alternative embodiment, a phase of AFF is equal to a phase of FFF. For example, if FFF has a phase of −10 degrees, AFF has a phase of −10 degrees, and if the phase of FFF changes to −70 degrees, the phase of AFF changes to −70 degrees. In yet another alternative embodiment, a phase of AFF is disproportional with a phase of FFF. For example, if FFF has a phase of −20 degrees, AFF has a phase of −70 degrees, and if the phase of FFF changes to −70 degrees, the phase of AFF changes to −10 degrees. As another example, if FFF has a phase of −20 degrees, AFF has a phase of −70 degrees, and if the phase of FFF changes to −60 degrees, the phase of AFF remains at −70 degrees.

A phase shift provided by FFF between an input of FFF and an output of FFF is proportional to a phase shift provided by AFF between an input of AFF and an output of AFF. For example, if FFF provides a phase shift of 90 degrees, AFF provides a phase shift of 270 degrees, and if FFF changes the phase shift to 30 degrees, AFF changes the phase shift to 90 degrees. In an alternative embodiment, a phase shift provided by AFF is equal to a phase shift provided by FFF. For example, if FFF provides a phase shift of 90 degrees, AFF provides a phase shift of 90 degrees, and if FFF changes the phase shift to 30 degrees, AFF changes the phase shift to 30 degrees. In yet another alternative embodiment, a phase shift provided by AFF is disproportional to a phase shift provided by FFF. For example, if FFF provides a phase shift of 90 degrees, AFF provides a phase shift of 260 degrees, and if FFF changes the phase shift to 30 degrees, AFF changes the phase shift to 70 degrees. As another example, if FFF provides a phase shift of 90 degrees, AFF provides a phase shift of 260 degrees, and if FFF changes the phase shift to 30 degrees, the phase shift provided by AFF remains at 260 degrees.

Figure 6:
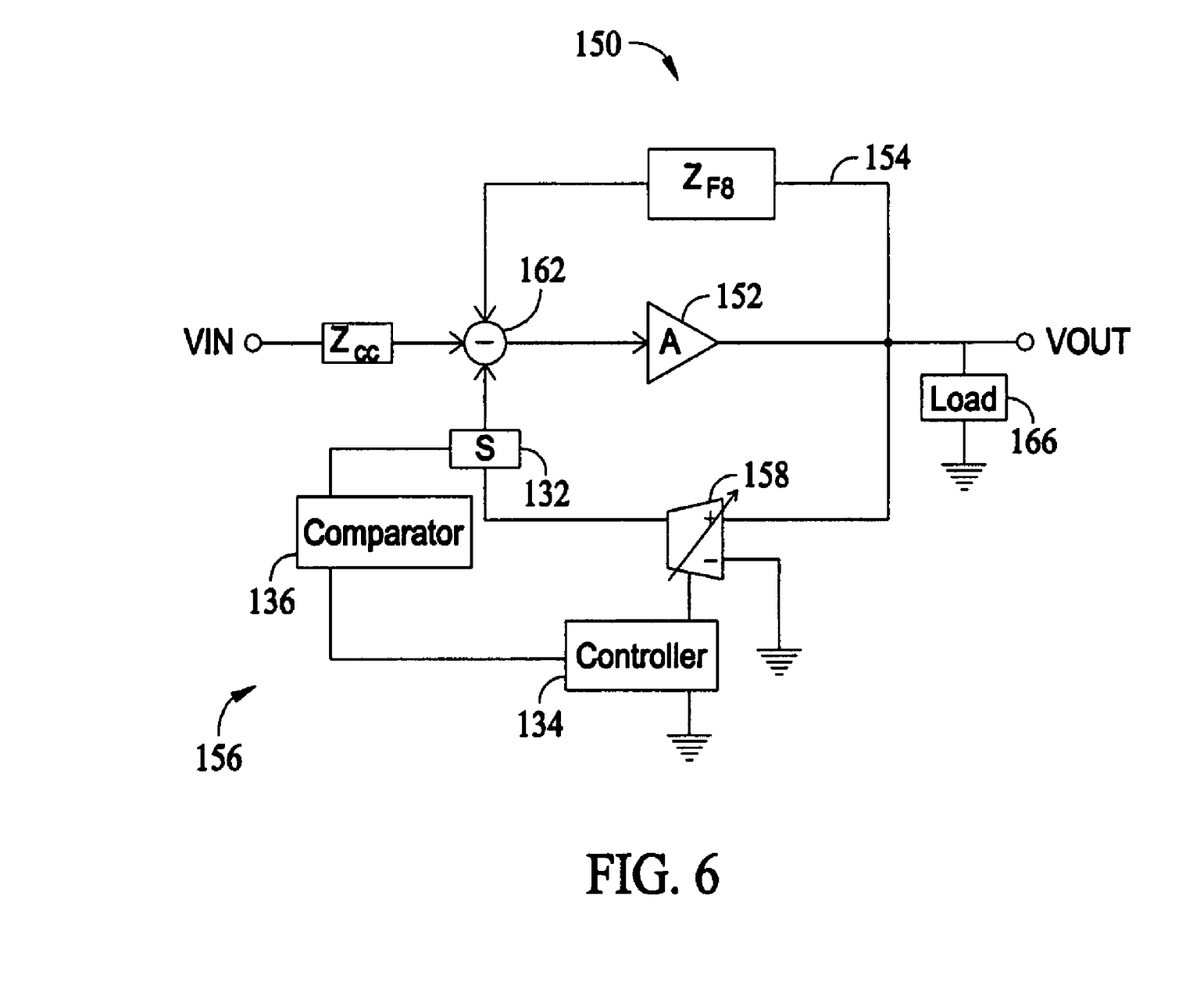
FIG. 6 shows another embodiment of AGAs coupled to the transducer array of FIG. 2.

FIG. 6 shows an embodiment of an AGA 150 coupled to T/R switches 44 at VIN and to T/R switches 48 at a VOUT. AGA 150 includes a trans-impedance amplifier 152, a fixed feedback loop 154 having an impedance $Z_{FB}$, and an adjustable feedback loop 156. Adjustable feedback loop 156 includes a variable trans-conductance cell 158, switch 132, controller 134, and comparator 136.

Fixed feedback loop 154 is coupled in parallel with trans-impedance amplifier 152 and is coupled to a node 162 and VOUT. Variable trans-conductance cell 158 is coupled to VOUT and to switch 132, which is coupled to node 162.

Trans-impedance amplifier 152 is coupled to ground via a load 166, such as, a capacitor having a capacitance $C_L$ or a resistor.

Trans-impedance amplifier 152 receives a sum signal and amplifies the sum signal based on a fixed gain of trans-impedance amplifier 152 to generate an amplified electrical signal at VOUT. Fixed feedback loop 154 samples an amplified electrical signal from VOUT, modifies the amplified electrical signal by applying impedance $Z_{FB}$, and generates a fixed feedback signal at node 162. Variable trans-conductance cell 158 samples an amplified electrical signal from VOUT, modifies the amplified electrical signal by applying a trans-conductance, and generates an adjustable feedback signal at node 162.

When transducer elements 40 receive the reflected echo signals from near-field 88, controller 134 changes a value of a trans-conductance of variable trans-conductance cell 158 by applying one or alternatively a combination of the functions. Comparator 136 compares a signal received from controller 134 with the reference signal. If comparator 136 determines based on the comparison that an amplitude of a signal received from controller 134 is at least equal to the pre-determined amplitude of the reference signal, comparator 136 does not send a signal to switch 132 to open switch 132. Switch 132 remains closed when transducer elements 40 receive the reflected echo signals from near-field 88.

When switch 132 is closed, an electrical signal generated by dividing VIN by impedance $Z_{CC}$, a fixed feedback signal output from fixed feedback loop 154, and an adjustable feedback signal output from variable trans-conductance cell 158 are summed at node 162 to generate a sum signal and the sum signal is provided to trans-impedance amplifier 152. In one embodiment, AGA 150 does not include impedance $Z_{CC}$ if trans-impedance amplifier 152 is replaced with a voltage amplifier. In an alternative embodiment, an adjustable feedback signal output from variable trans-conductance cell 158 is opposite in polarity to that of a fixed feedback signal output from fixed feedback loop 154. In yet another alternative embodiment, an adjustable feedback signal output from variable trans-conductance cell 158 has the same polarity as that of a fixed feedback signal output from fixed feedback loop 154. Controller 134 continues to apply one or alternatively a combination of the functions to variable trans-conductance cell 158 during a period of time during which transducer elements 40 receive the reflected echo signals from near-field 88.

When transducer elements 40 receive the reflected echo signals from far-field 90, controller 134 discontinues applying one or alternatively a combination of the functions to variable trans-conductance cell 158. Comparator 136 compares an amplitude of a signal received from controller 134 with the pre-determined amplitude of the reference signal. If comparator 136 determines, based on the comparison, that an amplitude of a signal received from controller 134 is less than the pre-determined amplitude of the reference signal, comparator 136 provides a signal to switch 132 to open switch 132. Controller 134 discontinues to apply one or alternatively a combination of the functions to variable trans-conductance cell 158 during a period of time in which transducer elements 40 receive the reflected echo signals from far-field 90.

Figure 7:
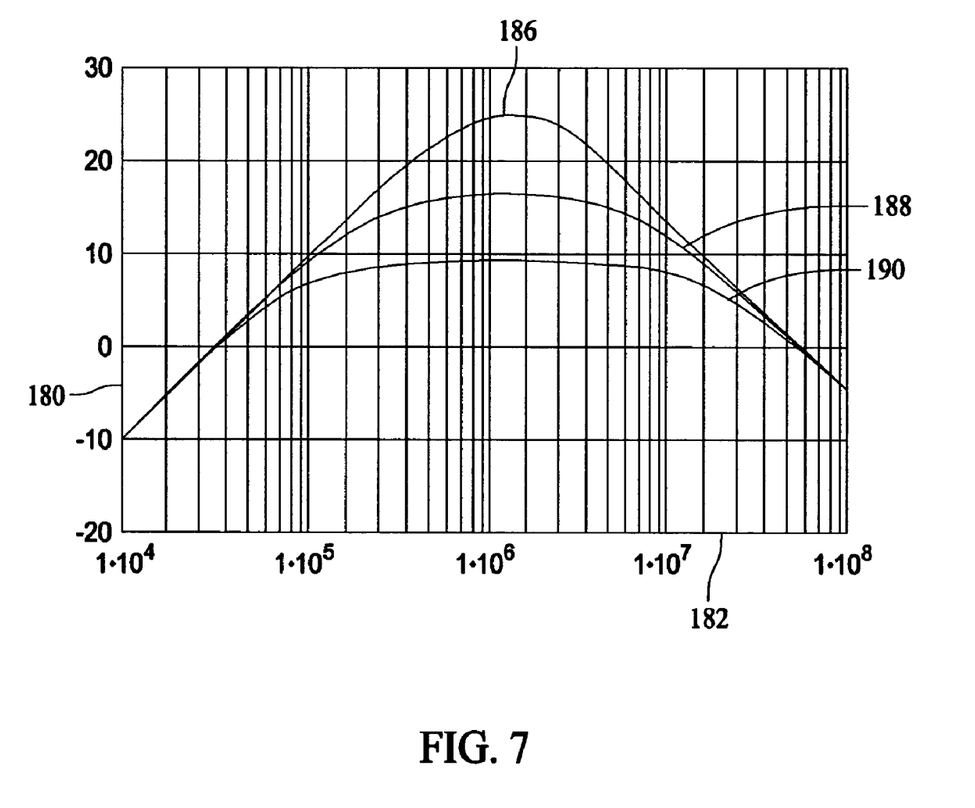
FIG. 7 shows a plot of a transfer function H(i,f) of an AGA of FIG. 6 as a function of a trans-conductance in an adjustable feedback loop of the AGA.

FIG. 7 shows a plot of a transfer function H(i,f) of AGA 150 versus frequency f, where $Z_{FB}$ equals 1/(2*π*j*0.5 picofarads*f), $Z_{CC}$ equals 1/(2*π*j*10 picofarads*f), and AFF has a value proportional to 2*π*j*f The transfer function H(i,f) is plotted on an ordinate 180 and the frequency f is plotted on an abscissa 182. The plot is obtained by calculating the transfer function H(i,f). The transfer function H(i,f) is calculated by applying Kirchoff's current law at node 162 and solving for VOUT/VIN. The transfer function H(i,f) equals $$H(i, f) := -Z_{FB}(f) \frac{A(f)}{(Z_{FB}(f) + GM(i, f)A(f)Z_{CC}(f)Z_{FB}(f) + Z_{CC}(f)A(f))} \quad (1)$$

where A(f) is a fixed gain of trans-impedance amplifier 152, GM is a trans-conductance of variable trans-conductance cell 158, and i is a current input from controller 134 to control variable trans-conductance cell 158. Controller 134 changes GM by changing the current i. The transfer function H(i,f) changes when GM changes.

Curve 186 shows the transfer function H(i,f) when a trans-conductance of variable trans-conductance cell 158 equals zero siemens, curve 188 shows the transfer function H(i,f) when a trans-conductance of variable trans-conductance cell 158 equals one picosiemens, and curve 190 shows the transfer function H(i,f) when a trans-conductance of variable trans-conductance cell 158 equals three picosiemens.

Figure 8:
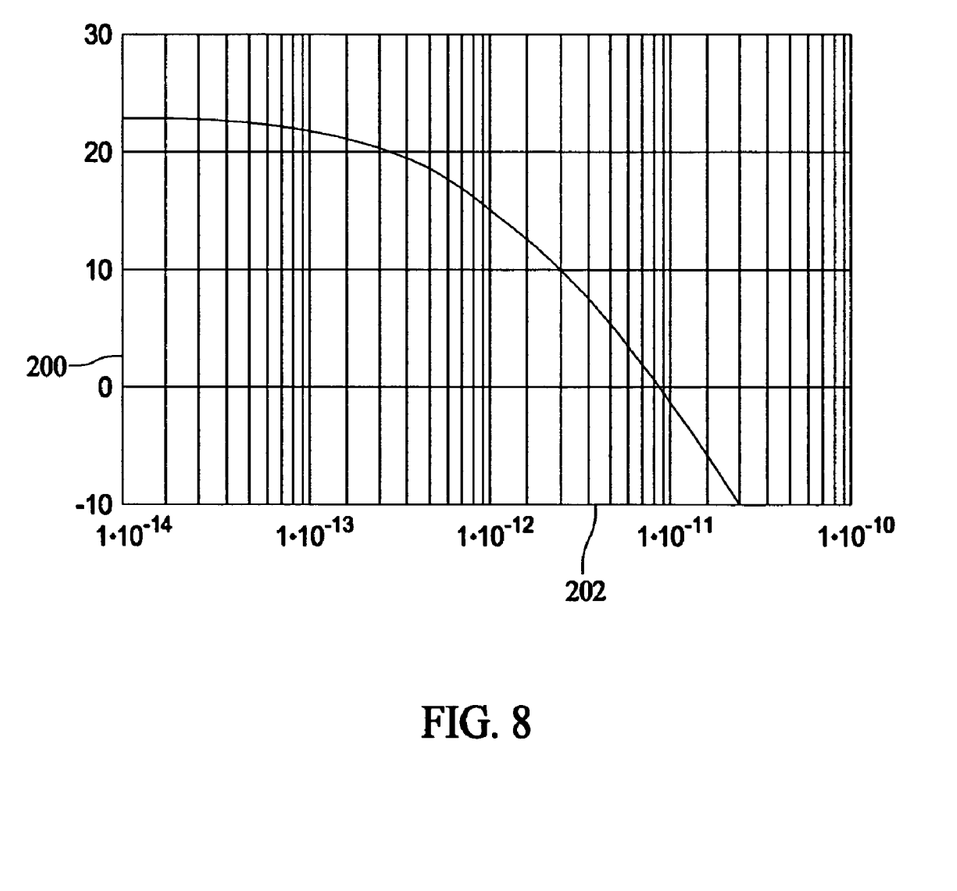
FIG. 8 shows a plot, at a specific frequency, of the transfer function H(i,f) as a function of a transcondutance of a trans-conductance cell located within an AGA of FIG. 6.

FIG. 8 shows a plot of the transfer function H(i,f) as a function of a value of AFF. The plot is obtained at a fixed frequency, such as three megahertz. The transfer function H(i,f) is plotted on an ordinate 200 and a transcondutance of variable trans-conductance cell 158 is plotted on an abscissa 202. If a transfer function of adjustable feedback loop 156 is proportional to the current i, the transfer function H(i,f) at the fixed frequency is controlled by the current i.

Technical effects of the systems and methods for adjusting gain include preventing amplifier 122 from being saturated when transducer elements 40 receive the reflected echo signals from near-field 88 and utilizing a minimal amount of power. Adjustable feedback loop prevent amplifier 122 from being saturated by controlling a gain of AGA 120. A gain of AGA 120 is controlled by controlling a sum signal provided to amplifier 122. A sum signal provided to amplifier 122 is controlled by applying one or alternatively a combination of the functions to AFF when transducer elements 40 receive the reflected echo signals from at least one of near-field 88 and far-field 90. The minimal amount of power is utilized because when transducer elements 40 receive the reflected echo signals from far-field 90, comparator 136 opens switch 132. The minimal amount of power is utilized also because power consumed by AFF when transducer elements 40 receive the reflected echo signals from near-field 88 is proportional to an amount of attenuation of ultrasonic energy produced by transducer elements 40. It is noted that AGA 120 is used in probes that are coupled to sub-systems other than sub-system 12.

While the invention has been described in terms of various specific embodiments, those skilled in the art will recognize that the invention can be practiced with modification within the spirit and scope of the claims.

What is claimed is:

1. An ultrasound probe comprising:
a housing;
a transducer element configured to receive a signal; and
an adjustable gain amplifier located inside said housing and configured to adjust a gain provided to the signal based on a function having a slope other than zero.

2. A probe in accordance with claim 1 wherein said adjustable gain amplifier includes a low noise amplifier configured to amplify the signal, a fixed feedback loop connected in parallel with said low noise amplifier and an adjustable feedback loop, said adjustable feedback loop coupled to an input and an output of said low noise amplifier.

3. A probe in accordance with claim 1 wherein said adjustable gain amplifier includes a low noise amplifier having a fixed gain, a fixed feedback loop and an adjustable feedback loop, said fixed feedback loop having a fixed feedback factor used to adjust the fixed gain, said adjustable feedback loop having an adjustable feedback factor used to adjust the fixed gain.

4. A probe in accordance with claim 1 wherein said adjustable gain amplifier includes a low noise amplifier having a fixed gain and an adjustable feedback loop, said adjustable feedback loop has an adjustable feedback factor used to adjust the fixed gain until said probe receives the signal from at least one of a near-field and a far-field.

5. A probe in accordance with claim 1 wherein said adjustable gain amplifier includes a fixed feedback loop having at least one of a voltage controlled voltage source, a voltage controlled current source, a current controlled current source, and a current controlled voltage source.

6. A probe in accordance with claim 1 wherein said adjustable gain amplifier includes an adjustable feedback loop and a controller configured to adjust an adjustable feedback factor of said adjustable feedback loop.

7. A probe in accordance with claim 1 wherein said adjustable gain amplifier includes an adjustable feedback loop and a controller configured to adjust an adjustable feedback factor of said adjustable feedback loop, and said adjustable feedback loop includes at least one of an adjustable voltage controlled voltage source, an adjustable voltage controlled current source, an adjustable current controlled current source, and an adjustable current controlled voltage source controlled by said controller.

8. A probe in accordance with claim 1 wherein said adjustable gain amplifier includes a fixed feedback loop and an adjustable feedback loop having a phase that is one of proportional, equal, and disproportional to a phase of said fixed feedback loop.

9. A probe in accordance with claim 1 wherein said adjustable gain amplifier includes a low noise amplifier and an adjustable feedback loop configured to convert a type of output of said low noise amplifier into a type of input of said low noise amplifier.

10. A probe in accordance with claim 1 wherein said adjustable gain amplifier includes an adjustable feedback loop having a switch coupled with at least one of an adjustable voltage controlled voltage source, an adjustable voltage controlled current source, an adjustable current controlled current source, and an adjustable current controlled voltage source.

11. A probe in accordance with claim 1 wherein said adjustable gain amplifier comprises:
an adjustable feedback loop;
a controller, said adjustable feedback loop including at least one of an adjustable voltage controlled voltage source, an adjustable voltage controlled current source, an adjustable current controlled current source, and an adjustable current controlled voltage source controlled by said controller;
a switch; and
a comparator coupled to said controller, said switch controlled by said comparator based on a signal generated by said controller.

12. A probe in accordance with claim 1 wherein said adjustable gain amplifier comprises:
an adjustable feedback loop;
a controller, said adjustable feedback loop includes at least one of an adjustable voltage controlled voltage source, an adjustable voltage controlled current source, an adjustable current controlled current source, and an adjustable current voltage source controlled by said controller;
a switch; and
a comparator coupled to said controller, said switch controlled by said comparator until said comparator determines that an amplitude of a signal received from said controller is less than a pre-determined amplitude of a reference signal.

13. A probe in accordance with claim 1 comprising:
a two-dimensional transducer array including said transducer element; and
a sub-aperture beamformer that receives an amplified electrical signal from said adjustable gain amplifier and generates a beam.

14. An ultrasound imaging system comprising:
an ultrasound probe having a housing;
a transducer element located within said housing and configured to receive a reflected echo signal from a subject;
an amplifier located within said housing and configured to communicate with said transducer element, said amplifier configured to receive an input signal from said transducer element and output an amplified signal based on the input signal;
an adjustable feedback loop connected with said amplifier and configured to provide a feedback signal to said amplifier, wherein the feedback signal varies based on the amplified signal.

15. An ultrasound imaging system according to claim 14 wherein said adjustable feedback loop is disconnected from said amplifier during a portion of time in which the reflected echo signal is received from the subject by said transducer element.

16. A method for adjusting a gain of an amplifier, said method comprising:
receiving a signal from a subject;
amplifying the signal according to a gain; and
adjusting the gain during a period of time in which the signal is received from a near-field, the near-field defining an area within the subject.

17. A method in accordance with claim 16 further comprising discontinuing said adjusting the gain during a period of time in which the signal is received from a far-field, the far-field defining an area within the subject that is different than the near-field.

18. A method in accordance with claim 16 wherein said adjusting the gain comprises adjusting, by an adjustable feedback loop located within a probe of an ultrasound imaging system, the gain during the period of time in which the signal is received from the near-field.

19. A method in accordance with claim 16 wherein said adjusting the gain comprises adjusting the gain based on at least one of an exponential function, a logarithmic function, a square root function, a linear function, and a random function.

20. A method in accordance with claim 16 further comprising:
coupling a fixed feedback loop in parallel with the amplifier;
coupling an adjustable feedback factor to an output of the amplifier;
coupling a switch to the adjustable feedback factor and to an input of the amplifier; and
controlling the adjustable feedback factor based on a function.

21. A method in accordance with claim 16 further comprising:
coupling a fixed feedback loop to the amplifier;
coupling an adjustable feedback loop to the amplifier; and
encompassing the amplifier, the fixed feedback loop, and the adjustable feedback loop within a housing of an ultrasound probe.

* * * * *